United States Patent [19]

Maeda et al.

[11] 4,271,382
[45] Jun. 2, 1981

[54] SPEED CONTROL CIRCUIT FOR PHASE-LOCKED LOOP MOTOR DRIVE SYSTEMS

[75] Inventors: Toshinobu Maeda; Yoshifumi Matsuoka, both of Kodoma, Japan

[73] Assignee: Matsushita Electric Industrial Co., Ltd., Kadoma, Japan

[21] Appl. No.: 51,855

[22] Filed: Jun. 25, 1979

[30] Foreign Application Priority Data

Jun. 27, 1978 [JP] Japan .................. 53-78153

[51] Int. Cl.³ .................................. H02P 5/16
[52] U.S. Cl. ..................... 318/318; 318/314; 331/1 A
[58] Field of Search ............... 318/314, 318, 341; 331/18, 1 A; 324/83 FE

[56] References Cited

U.S. PATENT DOCUMENTS

| | | | |
|---|---|---|---|
| 2,521,789 | 9/1950 | Grosdoff | 331/18 |
| 3,286,191 | 11/1966 | Cornwell | 324/83 FE |
| 3,344,361 | 9/1967 | Granqvist | 331/18 |
| 3,516,007 | 6/1970 | Bos et al. | 331/18 |
| 3,731,220 | 5/1973 | Besenfelder | 331/18 |
| 4,097,810 | 6/1978 | Aschwanden | 331/1 A |
| 4,110,694 | 8/1978 | Wilhelm | 331/1 A |

FOREIGN PATENT DOCUMENTS 1472115 5/1977 United Kingdom.
1503936 3/1978 United Kingdom.

*Primary Examiner*—David Smith, Jr.
*Attorney, Agent, or Firm*—Lowe, King, Price & Becker

[57] ABSTRACT

A phase-locked loop motor drive system includes a crystal-controlled frequency source for generating reference frequency pulses at a selectable frequency for driving the motor at a desired speed and a frequency divider coupled to the oscillator to reduce the oscillator frequency to a suitable value as a reference frequency for comparison with the frequency and phase of a signal derived from the motor. In order to provide fine adjustment of the motor speed, a speed control circuit is connected between the oscillator and the frequency divider to inhibit the passage of the oscillator pulses to the frequency divider for a selectable period immediately following an output pulse from the frequency divider when it is desired to decrease the motor speed, and inject a train of higher frequency pulses into the frequency divider while the passage of the oscillator pulses is inhibited when it is desired to increase the motor speed.

7 Claims, 3 Drawing Figures

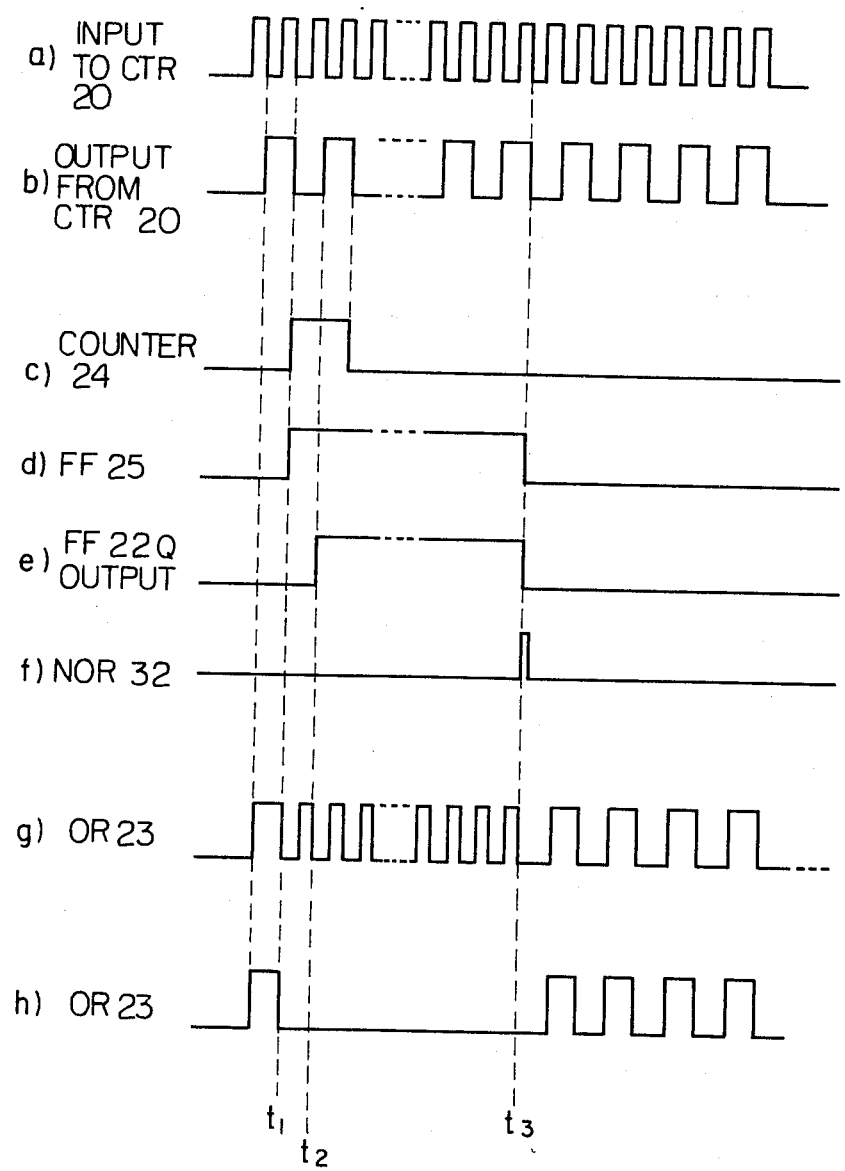

SPEED CONTROL CIRCUIT FOR PHASE-LOCKED LOOP MOTOR DRIVE SYSTEMS

BACKGROUND OF THE INVENTION

The present invention relates generally to phase-locked loop motor speed control system, and in particular to a fine adjustment speed control circuit for such systems.

Phase-locked loop systems are well known in the art and proved useful for controlling the speed of a motor of the high precision type such as turntable drive motors and those used in tape recorders. Japanese Patent laid-open applications 51-104515 and 52-101408 disclose such phase-locked loop motor speed control systems using crystal-controlled stabilized frequency source as a standard motor drive signal and a frequency divider or multiplier for varying the oscillator frequency to a suitable value.

Although the standard frequency is stabilized, the phase-controlled motor speed is not always what one would expect and fine adjustment speed control is often desired. This may be accomplished by varying the frequency of the standard motor drive signal with the use of a programmable frequency divider coupled to the crystal-controlled oscillator. However, this involves a large number of program steps in the programmable frequency divider or counter, tending the system to become considerably complicated with a consequential increase in cost.

SUMMARY OF THE INVENTION

Accordingly, an object of the present invention is to provide a fine adjustment speed control circuit for phase-locked loop motor drive systems which is considerably simple in circuit configuration.

The present invention contemplates to cut off the train of normal reference frequency pulses supplied to a frequency divider during a manually resettable period when a slightly lower speed is desired for the motor, or inject a train of higher reference frequency pulses during the resettable period when a slightly higher motor speed is desired. The manually resettable period is defined by the output of a bistable device which is set in response to an output signal from the frequency divider and is reset in response to the output of a programmable counter which is arranged to count the pulses of the normal reference frequency. The program count value of the counter is a fraction of the count capacity of the frequency divider and is reset by a manual setting. The pulse inhibition and injection is controlled in response to a speed decrement or speed increment command signal, respectively.

BRIEF DESCRIPTION OF THE DRAWINGS

The invention will be further described by way of example with reference to the accompanying drawings, in which:

FIGS. 3a to 3h show waveforms appearing at various parts of the circuit of FIG. 2.

DETAILED DESCRIPTION

Figure 1:
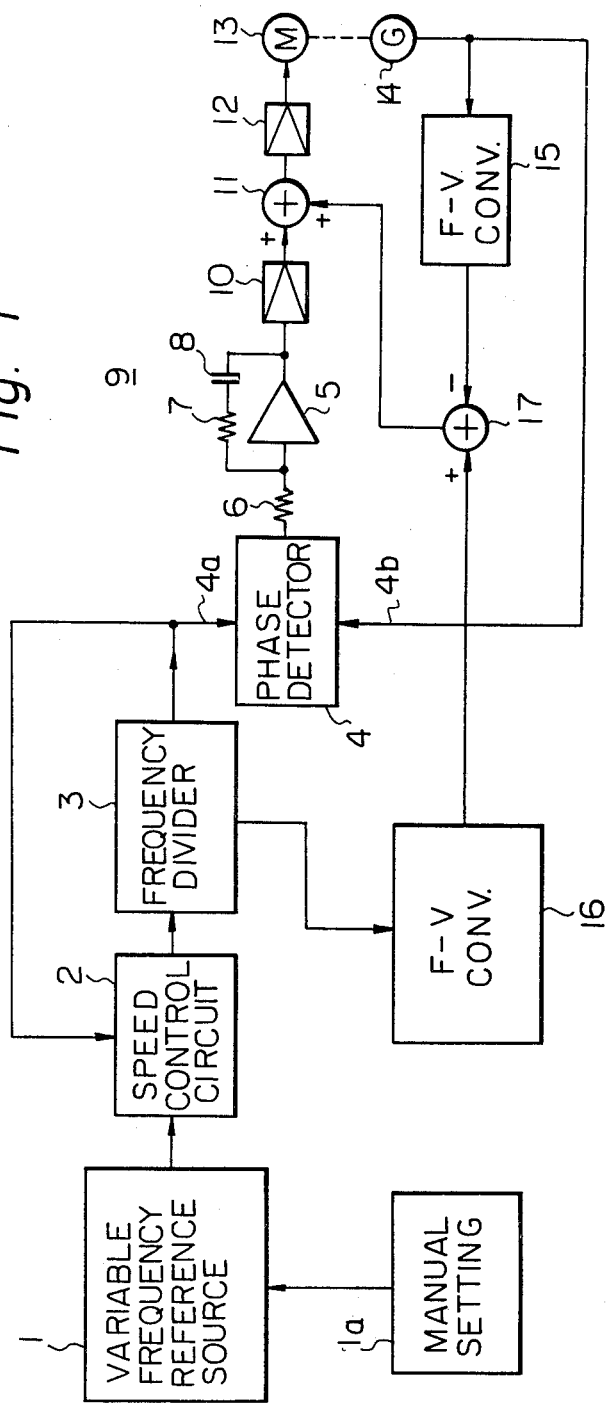
FIG. 1 is a schematic block diagram of a phase-locked loop motor drive system embodying the invention.

Referring now to FIG. 1, a phase-lock loop motor drive system embodying the invention is illustrated schematically as comprising a variable frequency reference source 1 which is essentially comprised of a crystal-controlled oscillator and a variable frequency divider for dividing the oscillator frequency by an integral multiple having one of two or more selectable discrete values in response to a command signal from a manual setting circuit 1a, so that the output of the reference frequency source 1 is one of manually selectable frequencies. A speed control circuit 2 according to the invention is connected to the reference frequency source 1 to provide speed adjustment by inhibiting the signal to be applied to a frequency divider 3 or injecting high frequency pulses into the train of input pulses to the frequency divider 3. The frequency divider 3 is a binary counter which delivers an output pulse for every count of 1000 pulses, for example, received from the reference frequency source 1 via the speed control circuit 2 and feeds it to an input terminal 4a of a digital phase detector 4 and feeds it back to the speed control circuit 2. The output of the phase detector 4 is coupled to an operational amplifier 5 through an integrating resistor 6 which comprises together with the amplifier 5 and a series-connected resistor 7 and capacitor 8 a conventional integrating lowpass filter 9, whose output is connected via an amplifier 10 to one input terminal of a summation amplifier 11, the output of summation amplifier 11 being coupled through an amplifier 12 to a motor 13 which is mechanically linked to a frequency generator 14 to feed pulses at frequencies related to the speed of the motor 13 to a frequency-to-voltage converter 15 and thence to a negative input terminal of a differential amplifier or subtractor 17 whose positive input terminal is connected to the output of a second frequency-to-voltage converter 16. This converter is responsive to the output signal from the frequency divider 3 to present a reference voltage corresponding to the selected frequency to the subtractor 17, so that the output signal from the latter is a voltage signal representative of the direction and magnitude of deviation of the motor speed from the setting value. The differential signal is then applied to another input terminal of the summation amplifier 11 to be combined with a phase differential signal which is derived from the phase detector 4 by comparing the phase of the reference signal from the divider 3 and the phase of speed related signal fed to its input terminal 4b from the frequency generator 14. The integrating filter 9 eliminates the high frequency components of the phase differential signal to provide a DC phase differential signal with which the motor speed is controlled when the frequency difference is nearly zero.

When the motor 13 is started, a large deviation signal will result from the output of differential amplifier 17, so that it is driven at a high acceleration rate until the differential signal reduces substantially to zero, whereupon the phase differential signal takes control of the motor speed.

Figure 2:
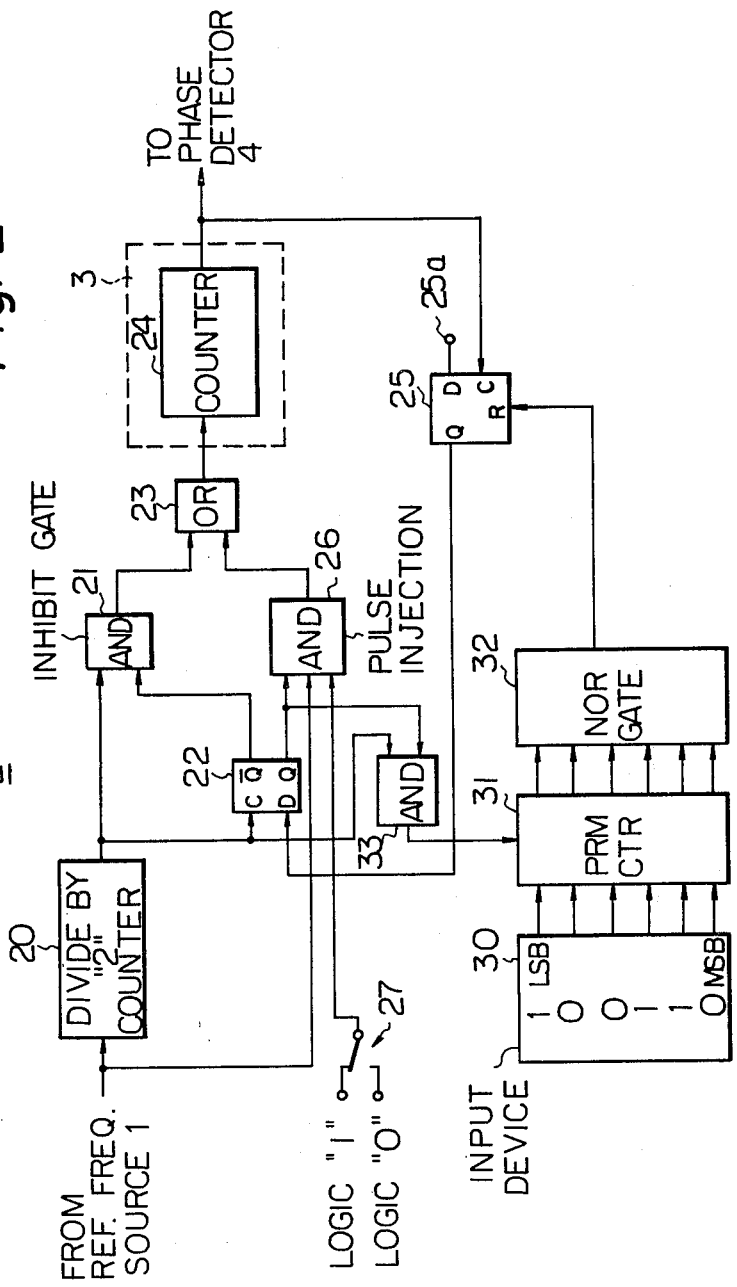
FIG. 2 is a circuit diagram of the speed control circuit of FIG. 1.

FIG. 2 illustrates details of the speed control circuit 2 of FIG. 1. The circuit 2 includes a divide-by-2 counter 20 which may comprise a single D-type flip-flop to provide an output frequency which is one-half the input frequency. The signal from the counter 20 is normally passed through an inhibit AND gate 21 and through an OR gate 23 to the frequency divider 3 which comprises a binary counter 24. The counter 24 generates an output pulse in response to a count of 1000 input pulses and feeds it to a D flip-flop 25 whose D input is connected to a terminal 25a at logical "1". The output of the divide-by-2 counter 20 is also coupled to the clock input of a D flip-flop 22 which changes the binary state of its true output to the binary state of its D input and hence to the output of flip-flop 25 in response to an output pulse from the counter 20. The complementary output of flip-flop 22 is connected to another input of AND gate 21 to block the passage of input pulses to the counter 24 when the complementary output of flip-flop 22 goes into logical "0" state in response to the simultaneous presence of logical "1" signals at the clock and data input terminals thereof.

A pulse injection AND gate 26 is provided which is enabled in response to the simultaneous presence of logical "1" signals from the true output of flip-flop 22 and a manual switch 27 to pass input pulses from the reference source 1 to counter 24 through OR gate 23.

A speed control input device 30 provides program binary signals to a programmable binary counter 31 for purposes of presetting it to a corrective data representing the desired amount of speed adjustment. The programmable counter 31 delivers all logical "0" signals to its output terminals when its count value reaches the preset count and activates a NOR gate 32 for resetting the flip-flop 25. The input pulses to the programmable counter 31 are supplied from the output of divide-by-2 counter 20 through an AND gate 33 when the latter is enabled by a logical "1" signal supplied from the true output of flip-flop 22.

The operation of the circuit of FIG. 2 will be visualized with reference to waveforms shown in FIGS. 3a to 3h. The input and output waveforms of the divide-by-2 counter 20 are shown in FIGS. 3a and 3b, respectively. Assume that it is desired to increase the speed of the motor 13 by 2.5%, for example, the programmable counter 31 is preset to "011001" corresponding to decimal "25" in response to binary signals supplied from the input device 30 and the switch 27 is positioned to provide a logical "1" signal to AND gate 26.

When the counter 24 is filled with 1000 input pulses at time $t_1$, the output of counter 24 changes to logical "1" (FIG. 3c) and in response to which the flip-flop 25 changes to logical "1" state (FIG. 3d). A logical "1" state at the clock input of flip-flop 22 at time $t_2$ results in a logical "1" signal at the true output of flip-flop 22 (FIG. 3e) to inhibit the gate 21 and enable the pulse injection gate 26 to pass the higher frequency pulses to the counter 24 from the reference source 1, instead of the lower frequency pulses normally supplied from the output of divider 20. The AND gate 33 is enabled in response to the Q output of flip-flop 22 going into a logical "1" state in order to pass the low frequency pulses to the programmable counter 31.

When the programmable counter 31 is filled with 25 input pulses at $t_3$, the NOR gate 32 provides an output pulse (FIG. 3f) to reset the flip-flop 25 to logical "0" and consequently the flip-flop 22. Therefore, during the time interval between $t_1$ and $t_3$, a train of fifty higher frequency pulses is supplied through AND gate 26 and OR gate 23 (FIG. 3g) to the counter 24, instead of a train of twenty-five lower frequency pulses which is inhibited by AND gate 21. This consequently reduces the interval between successive output pulses of counter 24 in the succeeding counting operations by 2.5%, thereby increasing its output frequency and hence the reference voltage provided by frequency-voltage converter 16 by 2.5%.

A speed reduction by 2.5% is likewise effected by operating the switch 27 to the logical "0" position. The operation of the circuit of FIG. 2 is similar to that described previously except that the AND gate 26 is disabled to prevent injection of the higher frequency pulses to the counter 24 during the time interval $t_1$ to $t_3$, so that there is a loss of twenty-five lower frequency pulses in the train of input pulses to the counter 24 during that interval as shown in FIG. 3h. This increases the interval between successive output pulses of counter 24 by 2.5% and consequently decreases its frequency and hence the reference voltage by 2.5%.

What is claimed is:

1. An oscillator circuit having fine frequency adjustment control comprising a pulse generator for generating pulses at high and low frequencies; a frequency divider having an input responsive to the pulse generator for dividing said pulses; a bistable circuit responsive to an output signal from said frequency divider to generate a first binary state signal; a programmable counter having a resettable count value for counting said low frequency pulses in response to the occurrence of said first binary state signal to cause said bistable circuit to generate a second binary state signal when said count value is reached thereby defining a desired period; means for selectively generating a speed increment and a speed decrement command signal; means for normally applying said low frequency pulses to said frequency divider; means responsive to said speed increment command signal for applying a train of said high frequency pulses in place of said low frequency pulses to said frequency divider during said defined period and means responsive to said speed decrement command signal for inhibiting the input of said frequency divider during said defined period.

2. A circuit arrangement as claimed in claim 1, wherein said low frequency is an integral submultiple of said high frequency.

3. A circuit arrangement as claimed in claim 1 or claim 2, wherein said pulse applying and inhibiting means comprise a first coincidence gate for passing said low frequency pulses to said frequency divider in response to a simultaneous presence of said first binary state of said bistable circuit and said speed increment command signal and a second coincidence gate for inhibiting the application of said low frequency pulses in response to a simultaneous presence of said first binary state of said bistable circuit and said speed decrement command signal.

4. A speed control system for a motor comprising:
means for generating a pulse signal having a frequency proportional to speed of said motor and a first voltage signal having a magnitude proportional to the speed of said motor;
a frequency divider for generating an output signal having a frequency that is an integral submultiple of the frequency of an input signal to the divider;
a frequency-to-voltage converter for generating a second voltage signal having a magnitude proportional to the output frequency of said frequency divider;
a phase comparator for generating a phase differential signal representing a difference in phase between said pulse signal and the output of said frequency divider;

a lowpass filter responsive to the output of said phase comparator;

a voltage comparator for generating a voltage differential signal representing a difference in magnitude between said first and second voltage signals;

a summing amplifier for combining said phase differential signal through said lowpass filter with said voltage differential signal for energizing said motor;

a source for generating pulse signals at high and low reference frequencies;

a bistable device responsive to the output of said frequency divider to assume a first binary state;

a programmable counter responsive to said low frequency pulses and said first binary state for defining a desired time period, said counter having a resettable count value for counting said low frequency reference pulses in response to the presence of said first binary state, said counter controlling said bistable device to change to a second binary state in response to said count value to define said desired period;

means for selectively generating a speed increment and a speed decrement command signal; and means for normally applying said low frequency reference pulse signal to said frequency divider; means responsive to said speed increment command signal for applying said high frequency reference pulse signal instead of said low frequency reference pulse signal to said frequency divider during said defined period, and means responsive to said speed decrement command signal for inhibiting the application of said low and high frequency reference pulse signals to said frequency divider during said defined period.

5. A speed control system as claimed in claim 4, wherein said frequency reference pulse source comprises a variable frequency pulse generator for generating pulses at a selectable frequency as said high frequency reference pulse signal and a second frequency divider responsive to said variable frequency pulse generator for dividing the pulses of said variable frequency pulse generator to generate said low frequency reference pulse signal.

6. A speed control system as claimed in claim 4 or claim 5, wherein said low reference frequency is an integral submultiple of said high reference frequency.

7. A speed control system as claimed in claim 4, wherein said means for applying and inhibiting pulse signals comprise a first coincidence gate for passing said low frequency reference pulses to said frequency divider in response to a simultaneous presence of said first binary state of said bistable device and said speed increment command signal and a second coincidence gate for inhibiting the application of said low and high frequency reference pulse signals in response to a simultaneous presence of said first binary state of said bistable device and said speed decrement command signal.

* * * * *